(12) United States Patent
Dequevy

(10) Patent No.: US 8,631,496 B2
(45) Date of Patent: *Jan. 14, 2014

(54) COMPUTER NETWORK INTRUSION DETECTION

(75) Inventor: Jean-Jacques Dequevy, Epinois (BE)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/488,595

(22) Filed: Jun. 5, 2012

(65) Prior Publication Data

US 2012/0297489 A1 Nov. 22, 2012

Related U.S. Application Data

(63) Continuation of application No. 11/916,373, filed on Dec. 3, 2007, now Pat. No. 8,272,054.

(30) Foreign Application Priority Data

Jun. 6, 2005 (EP) ..................................... 05300457
May 31, 2006 (WO) ................. PCT/EP2006/062766

(51) Int. Cl.
*H04L 29/06* (2006.01)

(52) U.S. Cl.
USPC ......................................................... 726/24

(58) Field of Classification Search
USPC .......................................................... 726/24
See application file for complete search history.

(56) References Cited

U.S. PATENT DOCUMENTS

| 5,570,366 | A | * | 10/1996 | Baker et al. .................... 370/312 |
| 5,809,235 | A | * | 9/1998 | Sharma et al. ................. 709/230 |
| 7,185,366 | B2 | * | 2/2007 | Mukai et al. ...................... 726/23 |
| 7,191,241 | B2 | * | 3/2007 | Boucher et al. ............... 709/230 |
| 7,284,267 | B1 | * | 10/2007 | McArdle et al. ................. 726/11 |
| 2002/0144156 | A1 | | 10/2002 | Copeland, III |
| 2002/0178382 | A1 | * | 11/2002 | Mukai et al. ................... 713/201 |
| 2004/0064589 | A1 | * | 4/2004 | Boucher et al. ............... 709/250 |

OTHER PUBLICATIONS

Canadian Office Action (Mail Date Dec. 13, 2012); Application No. 2,610,350, (Jan. 2006), 2 pages.

* cited by examiner

*Primary Examiner* — Oscar Louie
(74) *Attorney, Agent, or Firm* — Schmeiser, Olsen & Watts, LLP; John Pivnichny

(57) ABSTRACT

A method and system of identifying an attacker device attempting an intrusion into a network. At least one managed device of the network detects an incoming TCP/IP connection by the attacker device to the network. It is determined that the incoming TCP/IP connection is a Net BIOS connection that has created an invalid logon by the attacker device, linking the invalid logon with the NetBIOS TCP/IP connection, retrieving event log information from a security event log of the network, and determining (i) that a userid of the invalid logon is a local userid defined on a local device, (ii) that the userid of the invalid logon is a userid in a list of userids used by viruses, or (iii) that the userid of the invalid logon is neither the local userid nor is in the list of userids. The retrieved event log information is stored in a central violation database.

20 Claims, 6 Drawing Sheets

Warning : Somebody tried to access the machine IBMBEFS6 via the NETBIOS port without the good password Victim machine Informations

| | |
|---|---|
| The Local Hostname is | : IBMBEFS6 |
| The Local IP address is | : 9.36.165.12 |
| The Local Subnet is | : 255.255.255.0 |

TCP/IP Stack informations of Attacker machine

| | |
|---|---|
| The remote TCP Hostname is | : dyn-9-131-28-176.tr.ibm.com |
| The remote IP address is | : 9.131.28.176 |
| The remote TCP port is | : 1525 |
| The local TCP port is | : 445 |

The remote MAC Address of this machine : 00-02-B3-B3-88-91

Windows Event Viewer Informations about this attack

| | |
|---|---|
| The Userid that tried to log on is | : Administrator |
| The Userid warning level is | : Virus_Suspicion |
| The remote Workstation name is | : EGITIM-6HT268TA |
| The date & time of violation is | : "04/18/2005","17:44:46" |

Informations about the Site, Block, Floor, Network Switch

Informations about the Site, Block, Floor, Network Switch ipaddress: 9.36.185.251
mask: 255.255.255.0
gateway: 9.36.185.1
switch: BLS-SA-CY203/VLAN158
ipdomain: bru.be.ibm.com
site: BLS
block: City
floor: 2

FIG. 3

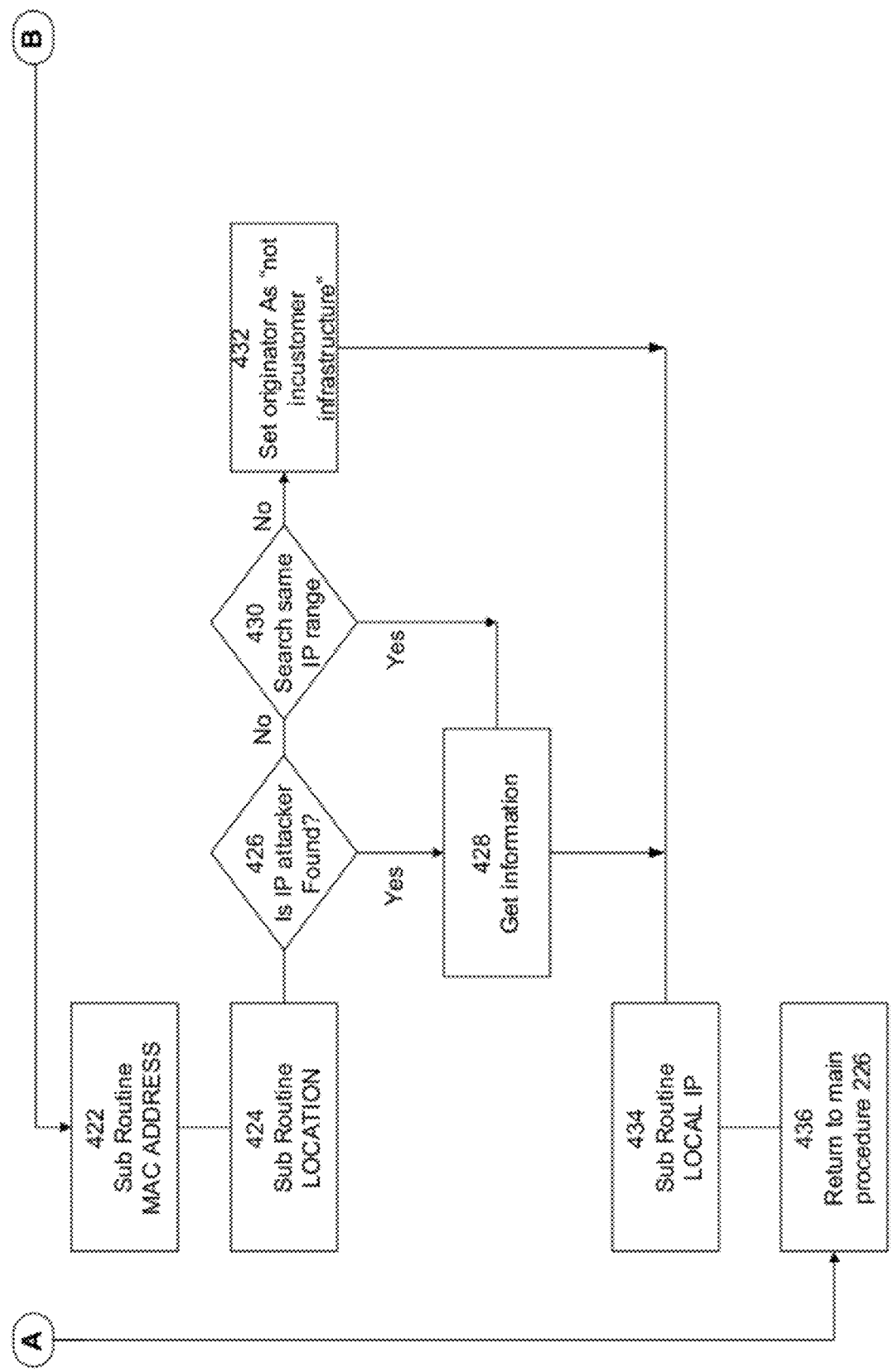

COMPUTER NETWORK INTRUSION DETECTION

This application is a continuation application claiming priority to Ser. No. 11/916,373, filed Dec. 3, 2007, now U.S. Pat. No. 8,272,054, issued Sep. 18, 2012.

TECHNICAL FIELD

The present invention relates generally to computer systems security and more particularly to a system and method of detecting and identifying the originator of invalid attempts to log on such computer systems to access a computer network.

BACKGROUND ART

In today's wide network enterprise, security has become a major concern to prevent unauthorized access to the many computer systems of the network. Computer systems within one business site are typically connected using a Local Area Network (LAN) and a Network Administrator is responsible for keeping the network up and running properly. As local area networks (LANs) continue to proliferate, and the number of personal computers (PCs) connected to LANs continue to grow at a rapid pace, network security becomes an ever increasing problem for network administrators.

As the trend of deploying distributed LANs continues, this provides multiple access points to an enterprise network. Each of these distributed access points, if not controlled, is a potential security risk to the network. Among these risks, the virus attacks impact strongly all IT infrastructures by the very fast spreading of the virus. A specific kind of virus which represents more than ⅓ of the total attacks is the well-known 'Worm' virus. This latter makes use of security loopholes in operating systems and spread from one system to another via networks through well-known TCP/IP port numbers 137,139 and 445.

TCP/IP is the acronym of Transmission Control Protocol/Internet Protocol (TCP/IP) ports numbers 137 (namely the Net BIOS Name Service), 139 (namely the Net BIOS Session Service) and 445 (namely the Microsoft-DS).

Another risk is the voluntary attack and the unauthorized access to protected resources (using also the spoofing).

A common misunderstanding is that firewalls recognize attacks and block them. Firewalls are simply a device that shuts off everything, and then turns back on only a few well-chosen items. In a perfect world, systems would already be "locked down" and secure and firewalls would be unneeded. The reason of having firewalls is precisely because security holes are left open accidentally.

Thus, when installing a firewall, the first thing it does is stopping all communications. Then the firewall administrator carefully adds "rules" allowing specific types of traffic to go through the firewall. For example, a typical corporate firewall allowing access to the Internet would stop all User Datagram Protocol (UDP) and Internet Control Message Protocol (ICMP) datagram traffic, stops incoming TCP connections but allows outgoing TCP connections. This stops all incoming connections from Internet hackers but still allows internal users to connect to the outgoing direction.

A firewall is simply a fence around the network with a couple of well chosen gates. A fence has no capability of detecting somebody trying to break in (such as digging a hole underneath it), nor does a fence know if somebody coming through the gate is allowed in. It simply restricts access to the designated points.

Finally, a firewall is not a dynamic defensive system. In contrast, an intrusion detection system (IDS) is much more of that dynamic system. An IDS does recognize attacks against the network that firewalls are unable to see.

Another problem with firewalls is that they are only at the boundary of the enterprise network. Roughly 80% of all financial losses due to hacking come from inside the network. A firewall at the perimeter of the network sees nothing going on inside; it sees only that traffic passes between the internal network and the Internet.

Log files and other accounting mechanisms can be used to track users and their activities. Using log files and audit information is known as passive detection since they rely on a passive analysis set of data. The system administrators are responsible for reviewing the operating system security event logs to determine if a system attack or breach of security has occurred. Some known products allow to review those logs such as Tivoli Risk Manager from the Assignee and GFi LANguard S.E.L.M. from GFI Software Ltd.

Tivoli Risk Manager is based on a framework infrastructure allowing a cross operating systems availability (OS/2 (OS/2 is a Trademark of IBM Corporation), Windows (Windows is a Trademark of Microsoft Corporation), Linux (Linux is a Trademark of Linus Torvalds) and AIX (AIX is a Trademark of IBM Corporation)) to report the alerts on a centralized console. This solution offers the possibility for the administrator to create the appropriate relationships between various security alerts. However, the relationships concerning the Net BIOS invalid attempts between different operating systems are not deeply analyzed and do not relate to external databases.

GFi LANguard S.E.L.M. is a security event log monitor that collects all security events in one central database, create reports and custom filters. This solution suffers from the limitation of operating on one Operating System only, namely Windows, thereby leaving attacks possible for others operating systems.

More generally, all existing solutions leave the administrators with receiving a large number of false warning messages that compel to spend a lot of time analyzing manually those messages and sorting out the non relevant violations from the true ones.

Therefore, there is a need for a solution that overcomes the aforementioned drawbacks.

However, the drawback of this solution is that all the source information is coming from built-in log files from Operating Systems, and those log files give only the workstation/computer name of the attacker device. If this computer name is not registered in any Domain Name Server (DNS) servers, or is unknown from the victim company, it is often impossible to locate physically this attacker device.

With those existing analyzing solutions, the problem remains because as the log alert is done after the security event, there is no way to check if a device is connected on a victim server, as there is no built-in way to check the history of TCP/IP ports into one Windows server.

Others TCP/IP logger tools exist but require a manual check of the log files after the security event occurs to find if there were remote attacks.

Moreover those TCP/IP tools require to look deeply into the TCP/IP stack (the software that looks the TCP/IP protocol) and are not able to verify if one Windows Logon 137/139/445 is normal or not, if it happens into a Windows file server that has as primary role to give access to the 137/139/445 TCP ports.

So, this is the main drawback of those log analysis methods. Moreover it takes time to analyze and physically locate the attacker device and to disconnect it.

The present invention offers a solution to remove those drawbacks.

SUMMARY OF THE INVENTION

Accordingly, it is an object of the invention to provide an instantaneous and 'on-line' solution to log all TCP/IP ports into one local log file. The present invention operates simultaneously at two levels: at the TCP/IP stack one and at the Security Event Log one.

It is another object of the invention to provide a system and method to retrieve and log the MAC address of an attacker device (MAC in short for Media Access Control, a hardware address that uniquely identifies each node of a network) in case of attack on one of the TCP/IP port numbers 137/139/445.

It is another object of the invention to provide a system and method to retrieve and log the IP address of an attacker device in case of attack on one of the TCP/IP port numbers 137/139/445.

It is another object of the invention to provide a system and method to retrieve and log the physical location (City, Building, Floor, Switch number, port on the switch) of an attacker device by linking the IP address to the network infrastructure description of the company, in case of attack on one of the TCP/IP port numbers 137/139/445.

A further object of the invention is to provide a solution to easily and efficiently identifying in an enterprise computer network the devices infected by WORM viruses.

Yet another object of the invention is to provide a solution involving less human resources to analyze computer system violation events thereby allowing fast proactive reaction.

According to an aspect of the present invention, a system as set forth in the appended claims is proposed for detecting the invalid access of a computer device to a computer network.

More generally, the method operates preferably in a computer network having computer servers operating on different operating systems and a plurality of computer devices. Each computer device is managed by a computer server at the operating system level. The computer network includes a plurality of information databases containing information associated with the users and with the computer devices of the computer network. The method allows generating on each computer server a set of identifying files for each computer device managed by the computer server. All sets of identifying files from the plurality of computer servers are gathered into a unique central violation database. Links are created between each set of identifying files and the plurality of information databases in order to determine a level of network access violation for each computer device. Violation messages for each computer device are generated based on the level of network access violation.

The present invention is directed to a method, system and computer program as defined in the independent claims.

According to an aspect of the present invention, a method as set forth in appended claim 1 is proposed for identifying a device attempting an intrusion into a TCP/IP protocol based network is presented. The method operates in a network comprising a plurality of managed devices among which at least one managed device process a security event log. The method comprises the steps of:

detecting at the at least one managed device an incoming TCP/IP connection;

extracting from TCP/IP stack of the at least one managed device all TCP/IP information related to the device generating the detected incoming connection;

comparing the port number of the incoming TCP/IP connection to a set of predefined port numbers;

retrieving from the security event log all event log information associated to the detected incoming TCP/IP connection if the comparison matches; and gathering the TCP/IP information and the event log information of the device generating the detected incoming TCP/IP connection into a violation log file.

Further embodiments of the invention are provided in the appended dependent claims.

In a commercial form, computer readable program means allowing a computer machine to perform the method according to any one of the method claims are embodied on a program storage device (e.g., a hardware storage medium, such as a hard disk drive) that is readable by the computer machine.

The computer program product may be loaded/downloaded into a client machine and be remotely monitored from a central violation machine that interprets the violation log file received at the end of the execution of the program. A violation report may be generated in case of violation to inform a network administrator of the intrusion.

BRIEF DESCRIPTION OF THE DRAWINGS

FIG. 3 shows an image of a final violation report;

FIGS. 4A and 4B are is a flow chart of the steps of the process to analyze the Security Event log.

DETAILED DESCRIPTION OF THE INVENTION

Before entering into details in the description of the present invention, the terms used in the document hereinafter have the following meaning:

TCP/IP protocol (Transmission Control Protocol/Internet Protocol): A protocol for communication between computers, used as a standard for transmitting data over networks and as the basis for standard Internet protocols.

TCP/IP Port Number: a port is an endpoint to a logical connection. Some ports have pre-assigned numbers. The port numbers are divided into three ranges: the Well Known Ports, the Registered Ports, and the Dynamic and/or Private Ports. The Well Known Ports are those from 0 through 1023. The Registered Ports are those from 1024 through 49151 The Dynamic and/or Private Ports are those from 49152 through 65535.

TCP/IP stack: the software implementation of the TCP/IP protocol. Gathers all the TCP/IP information relative to any device managed in a network.

IP Address (Internet Protocol address): The address of a device attached to an IP network (TCP/IP network). Every client, server and network device have a unique IP address for each network connection.

Host Name: is the unique name by which a device is known on a network.

Security Event Log: a log file that records all information related to any security event. The events are logged locally to storage, such as a hard disk drive, that is resident on the same computer that the operating system is running. The events logging process can also be conducted over a network, wherein events are logged on another computer remote from the host computer where the event arises. The Security Event log can contain valid and invalid logon attempts. Each kind event is referenced by a specific number.

Event ID: a number identifying the kind of event.

Userid: the name which uniquely identifies a particular user's account on a shared computing system.

Figure 1:
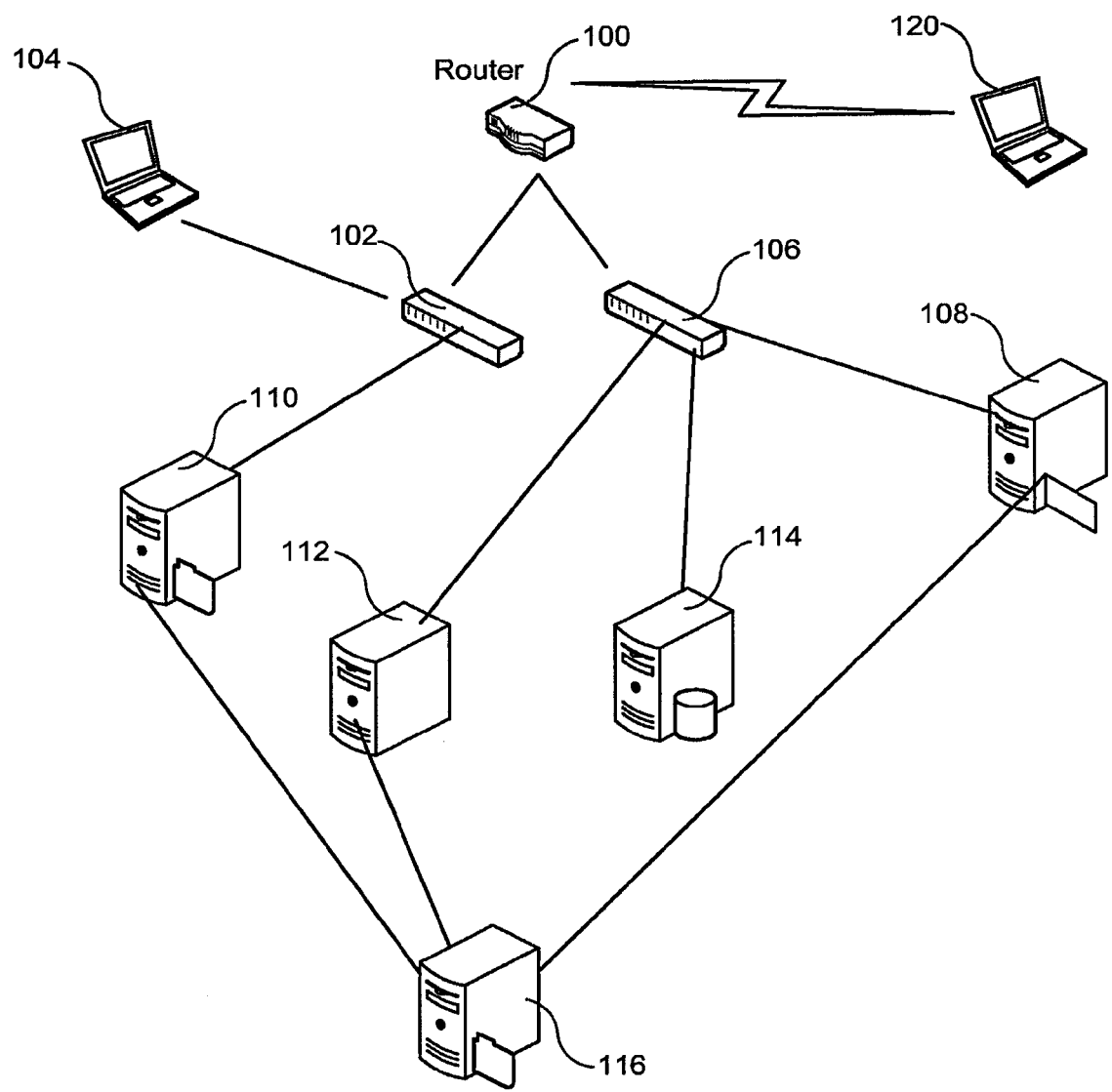
FIG. 1 is a general view of a network infrastructure to run the method of the present invention.

A preferred network environment where the Intrusion Detection Tool of the present invention operates is shown on FIG. 1. As shown in the figure, a campus network contains routers 100, switches 102, 106 (preferably Ethernet ones), mail servers 108, Operating System servers (Windows 110, AIX 112, OS/2 114) and a central violation database 116. A first personal computer 104 within the local campus network is shown coupled to the network via an Ethernet Switch 102 to illustrate a first attacker device attempting to access the network. A second personal computer 120 physically located outside of the local campus network is shown coupled to the local campus network via a router 100 to illustrate a second attacker device attempting to access the network. The attacker device may be a workstation or a server or more generally any computer device being able to enter the network.

The main idea of the present invention is to track bad logons by creating links between two independent information levels, the TCP/IP stack information one side and the Windows Security Event Log information on the other side. The method allows establishing the relationship between the workstation/computer name stored in the Security Event Log and the TCP/IP information related to this workstation/computer name.

A log file containing all details of incoming or outgoing TCP/IP connections is continuously updated with the new connections.

As soon as one of the 137/139/445 TCP/IP ports is detected, the Security Event Log is searched to determine if this Net BIOS connection is creating a bad logon or not.

If the originator device creates at least one bad logon, then all logical and physical information concerning this attacker device (104 and/or 120 of FIG. 1) is retrieved both from the TCP/IP stack and the Security Event Log.

Logical information retrieved comprises:
the IP address;
the Network Host name;
the MAC address of its network adapter;
the Workstation/Computer name;
the userid;
the presence or not of this userid in a list of authorized userids defined on a server;
the presence or not of this userid in a SPY list that contains all default userid used by the Worm virus.

The physical information retrieved comprises:
the country;
the building;
the floor;
the Ethernet Switch identification;
the port number on this switch.

All this information is gathered and added to the central violation database 116 to inform in real-time the network administrator(s) that a security breach is occurring.

Additionally, one or more information mails may be sent to one or more recipients.

Figure 2A:
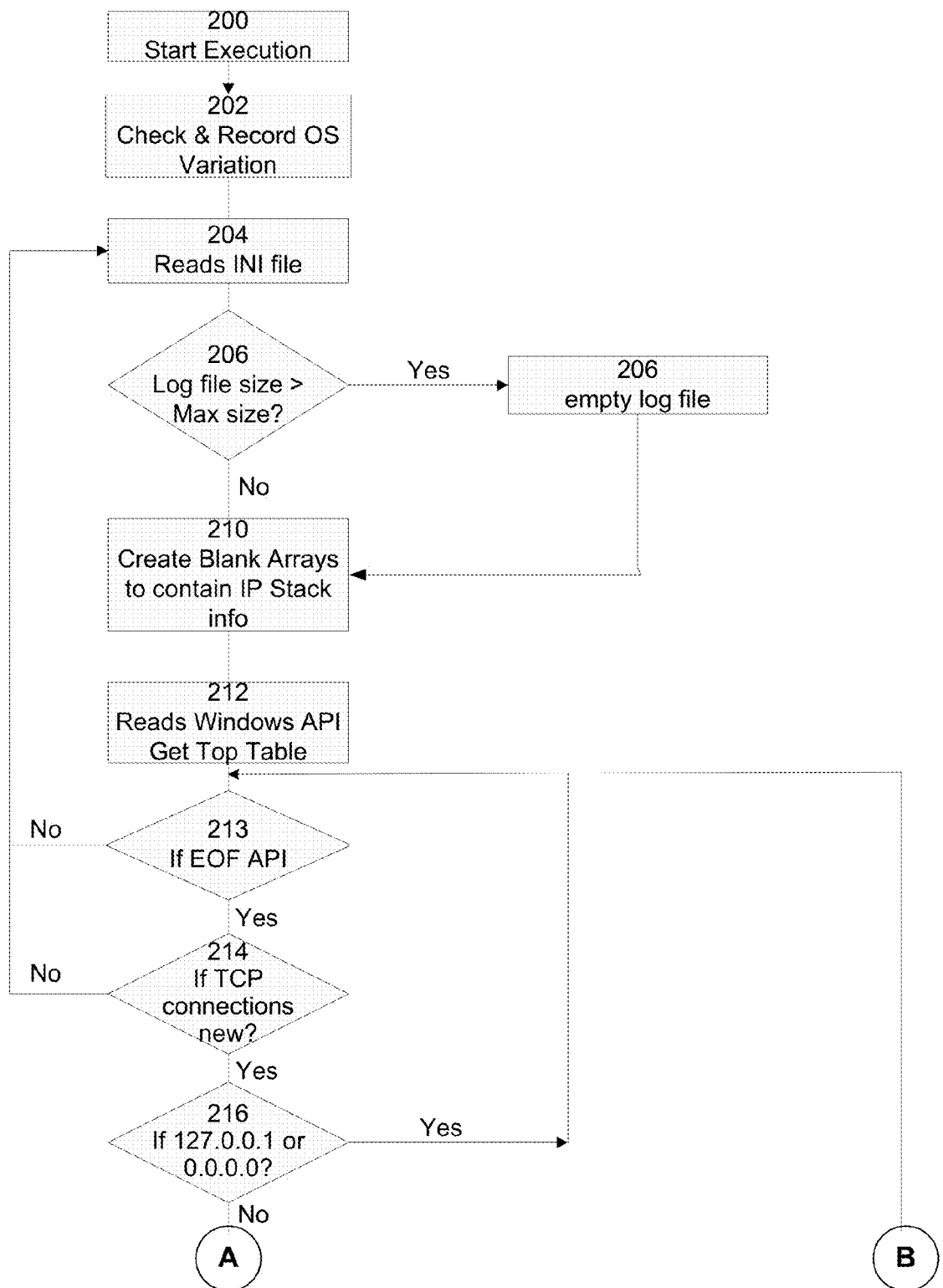
FIGS. 2A and 2B are a flow chart of the steps of a preferred embodiment of the method of the present invention.
Figure 2B:
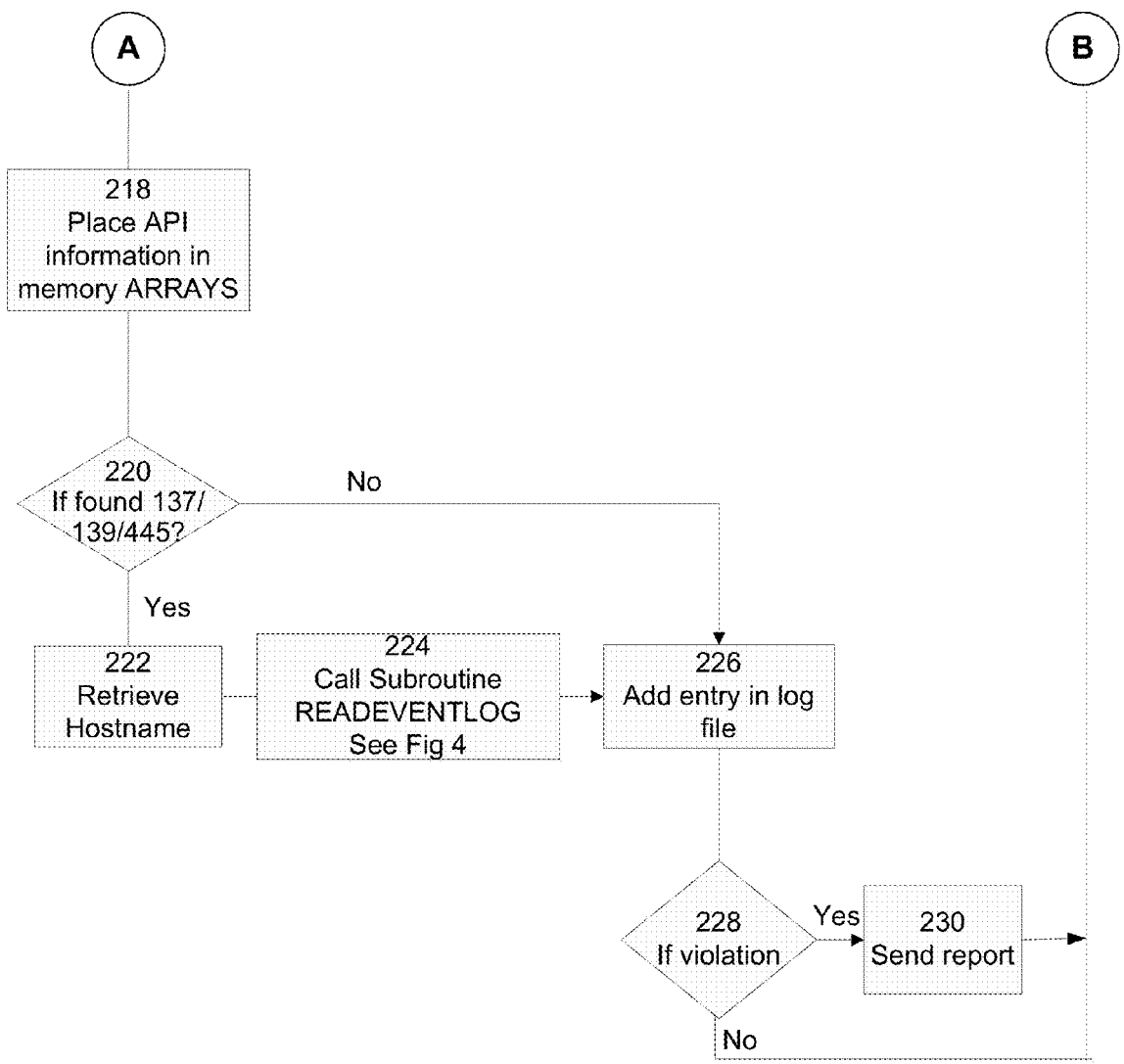

Referring now to FIGS. 2A and 2B (collectively referred to herein as FIG. 2), there is illustrated a preferred embodiment of the general process of the present invention. Preferably, the process runs on any computer device operating in a Windows environment (Windows 2000 Professional, Server 2000, Server 2003 or Windows XP Professional).

On a first step 200 the process begins at the analysis device startup.

On step 202, the process checks the operating system of the analysis device on which it operates.

On step 204, several configuration parameters defined into a configuration file (generally named as a '.INI' file) are identified and stored:

```
[MAIL]
SENDING=YES
[SERVER]
MAILSERVER="<mail server address>"
[DESTINATION]
MAIL1="<mail recipient 1>"
MAIL2="<mail recipient 2>"
BCC="<mail blank copy>"
[SPEED]
INTERVAL=2sec.
[MAC_ADDRESS]
MAC=YES
[LOGFILE]
MAXSIZE=10000bytes
[POPUP]
SHOW=YES
```

It is to be appreciated that those parameters such as the time interval between two cycles may be adjusted depending on the network characteristics.

On step 206, the process compares the size of the current log file to the MAXSIZE parameter previously defined in the '.INI' file. If the current value is greater than the MAXSIZE value, then the process goes to step 208 (branch Yes), where the log file is emptied.

If the current value is lower than the current value, then the process goes to step 210 (branch No).

On step 210, the process creates IP-stack memory arrays to store further on step 212 the IP-stack information.

On step 212, IP-stack information is instantaneously read from the well-known Windows 'GetTcpTable' API.

The aforementioned API provides the following information:
The local IP address of the analysis device;
The local TCP communication Port of the analysis device;
The remote IP address of the attacker device;
The remote TCP communication port of the attacker device; and
The remote host name of the attacker device.

Next, on step 213, the process tests the end of the API depth. This test intends to verify if it is the last connection to record. If the API is not ended (branch No), the process goes to step 214, otherwise if it is the last record of the API (branch Yes), the process goes to step 204 to restart the '.INI' file read cycle.

On step 214, the process compares the current connections information previously read on step 212 to the connections information existing from the last read cycle. This test intends to verify which connections are new. If no new connection is found (branch NO), then the process loops back to step 204 to start a new '.INI' file read cycle. If at least one new connection is found (branch Yes), the process continues with step 216.

On step 216, the process filters unwanted IP addresses. In a preferred implementation, unwanted IP addresses equal to "127.0.0.1" or to "0.0.0.0" are sorted as being non significant to be logged.

If one of the unwanted values is met (branch Yes), then the process loops back to step 213 to analyze the next active connection.

If no unwanted value is met (branch No), then the process continues with step 218.

On step 218, the process stores the new connections information found into one IP-stack memory array, and goes to step 220.

On step 220, the process searches if one of the 137, 139 or 445 ports is present in the current analyzed connection. If the test result is 'NO', then the process goes to step 226, otherwise, if the test result is 'Yes' which means that there is a potential virus attack, then the process continues with step 222.

On step 222, the process retrieves the network Host name of the current analyzed connection. The network Host name is either a fixed host name or a dynamic one distributed by a Dynamic Host Configuration Protocol (DHCP) server. Then, the process goes to step 224.

On step 224, the process calls a sub-routine to analyze the Security Event log. This process is further detailed with reference to FIG. 4. After completion of routine step 224, the process goes to step 226.

On step 226, a new entry is added into a violation result log file, depending on the results of the previous Security Event analysis. Preferably, three different types of entries can be written:

I. If the connection analyzed is not a Net BIOS connection, then the record contains at least the following fields:
The date and time
The local IP address
The local IP port
The remote IP address
The remote IP port.
I. If the connection analyzed is a Net BIOS connection but no violation is detected, then the record contains the Host name in addition to the fields previously listed.
I. If the connection analyzed is a Net BIOS connection and a violation detected is detected, then the record contains complementary information to identify the attacker device, such as the workstation/computer name and the userid used for the violation. The list below exemplifies such detailed information:
The date and time
The local IP address
The local IP port
The remote IP address
The remote Port Address
The Host name
The Workstation name
The userid used for the violation
The MAC address
The warning level of the violation (Low, Medium, High).

After the entry is recorded in the violation log file, the process goes to step 228.

On step 228, if it is confirmed that the previous entry is a type III entry, then the process goes to step 230, otherwise the process loops back to step 213.

On step 230, the full information including both the Security Event log details, the IP-stack information and all additional information such as the warning level is sent as a final violation report to the central violation database. And the process loops back to step 213.

FIG. 3 illustrates an example of such violation report for a virus attack. On top of the windows, a Warning message is set. The exemplified windows is divided into several areas that provide each the information relative to the victim device, the TCP/IP stack of the attacker device, the logical and physical information of the attack.

Figure 4A:
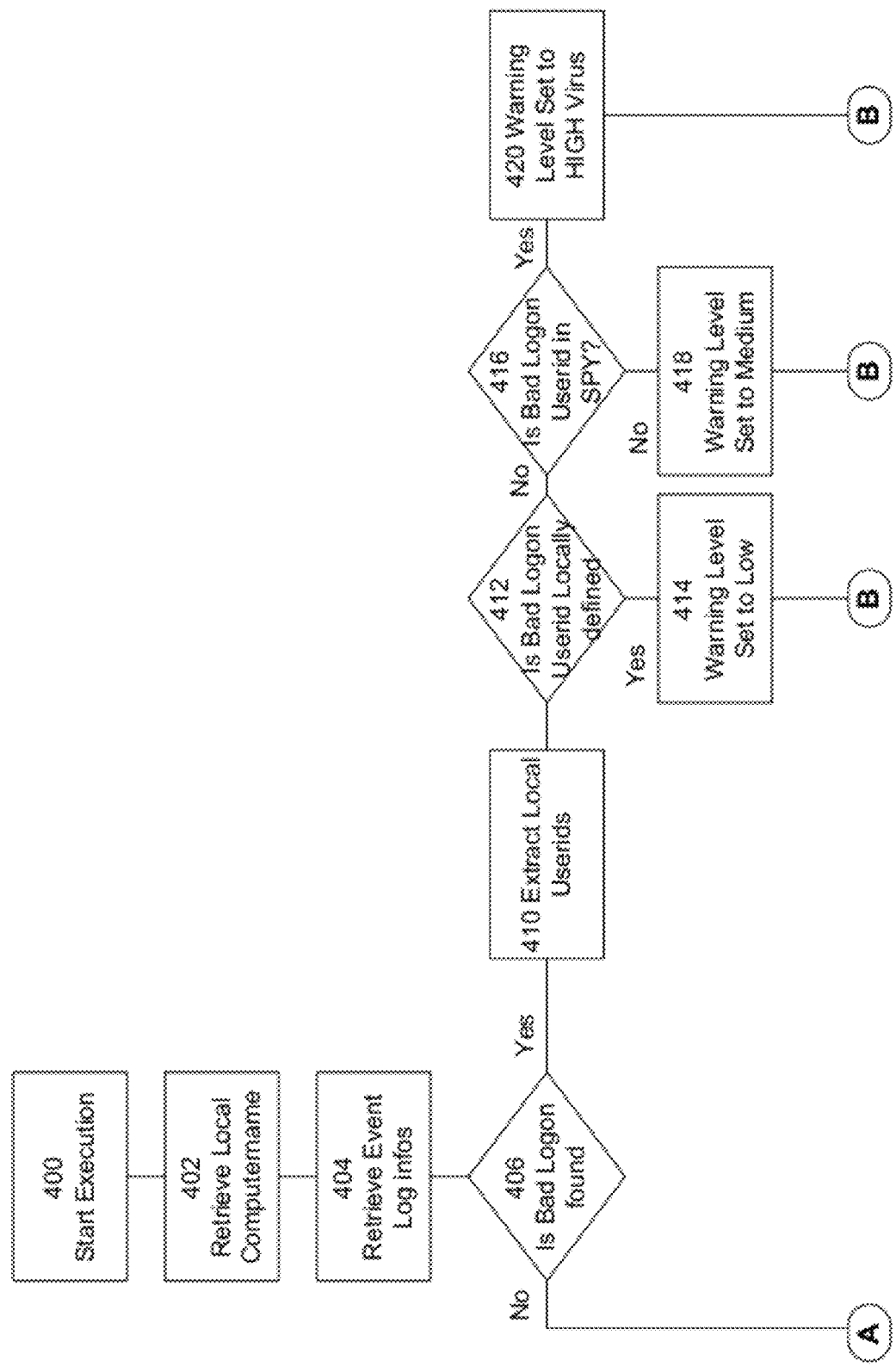

Going now to FIGS. 4A and 4B (collectively referred to herein as FIG. 4), the process to read the information from the Security Event Log is now described.

On step 400, the process called from step 224 begins.

On step 402, the local Host name of the device running the process is retrieved.

On step 404, the process extracts the latest violations events from the Security Event Log. As known by the person skilled in the art, the Security Event Log contains several information fields, among which the well-known 'Event ID' to qualify the nature of the Security Event. At step 404, a sorting on Event IDs '529, 530, 531, 532, 533, 534, 535, 537, and 539' is preferably made to extract the violation information corresponding to these Event Ids only.

Next, on step 406, the process checks if a bad (invalid) logon has occurred since the last process execution.

If a bad logon is detected, the process links this bad logon with the latest new NETBIOS connection detected on step 220, and goes to step 410.

If no bad logon is detected, the process continues to step 436.

On step 410, the process extracts the userids defined on the local device.

Next, on step 412, the process compares the userid found by the current violation with userids previously found and defined on the local device.

If the userid used for the violation is one of the userids defined for the local device, then the process continues to step 414 to set a 'low' level warning (step 414). And the process goes to step 422.

If the userid used for the violation is not one the userids defined for the local device, then the process continues with the step 416.

On step 416, the process compares the userid used for the violation with the userids defined in a local SPY list.

A SPY list as it is known by those skilled in the art references all the userids continuously used by the viruses.

If the userid used for the violation is one of the SPY list userids, then the process goes to step 420 to set a 'high' level warning related to a virus attack. And the process continues with step 422.

If the userid used for the violation is not one of the SPY list userids, then the process goes to step 418 to set a 'medium' level warning.

On next step 422, the process retrieves the MAC address of the attacker device based on the parameters read on step 204.

On step 424, a new subroutine 'LOCATION' is started to compare the IP address of the attacker device to a list of IP addresses contained in a network infrastructure database that defines the physical location of each IP address.

On step 426, a test is made to determine if the IP address of the attacker device is one of those existing in the network infrastructure database.

If Yes, the process continues with step 428 where all the information related to the owner of the attacker device is extracted from the network infrastructure database. This information is added to the violation report that is to be sent in step 230. And the process goes to step 434.

If No, meaning that the IP address of the attacker device is not found in the network infrastructure database, the process continues to step 430.

On step 430, the process allows to enlarge the location search to determine where all devices pertaining to the same group of IP address are located. To achieve, the IP address of the attacker device is truncated to remove the last range (for example a new search on '9.36.164' is made in place of '9.36.164.76').

If the result of the search is 'Yes' meaning that the group of devices having the same IP address ranges is identified, then the process continues with step 428, otherwise the process goes to step 432.

On step 432, a comment as to the 'unidentified location' is added to the final violation report later sent in step 230.

On next step 434, the IP address of the local device is added to the final violation report later sent in step 230.

And finally on step 436, the sub-routine returns to the initial calling process at step 226.

To summarize, the present invention allows detecting a virus attack and to alert the network administrator instantaneously before the user of the attacked device is aware of the attack.

Moreover, due to the fast virus detection, the network administrator is able to control and mitigate the spreading of the virus attack, thereby considerably lowering the cost of the virus attack effects.

The present invention has been described for detecting any virus attack, but it is to be appreciated that it would easily used to monitor any invalid access on real time and to take the necessary actions on the fly.

Finally, one other advantage of the present invention is the low use of CPU resources.

The invention claimed is:

1. A method of identifying an attacker device attempting an intrusion into a Transmission Control Protocol/Internet Protocol (TCP/IP) protocol based network, said method comprising:
    detecting, by at least one managed device of the network, an incoming TCP/IP connection by the attacker device to the network;
    after said detecting the incoming TCP/IP connection, performing a process that comprises determining that the incoming TCP/IP connection is a Net BIOS connection that has created an invalid logon by the attacker device, linking the invalid logon with the NetBIOS TCP/IP connection, retrieving event log information from a security event log of the network, and determining (i) that a userid of the invalid logon is a local userid defined on a local device of the at least one managed device, (ii) that the userid of the invalid logon is a userid in a list of userids used by viruses, or (iii) that the userid of the invalid logon is neither the local userid defined on the local device nor is in the list of userids used by viruses; and
    after said performing the process, storing the retrieved event log information in a central violation database of the network.

2. The method of claim 1, said method comprising after said performing the process:
    generating a report comprising the event log information; and
    storing the report in the central violation database of the network.

3. The method of claim 2, said method further comprising:
    after said detecting the incoming TCP/IP connection and before said performing the process, extracting from a TCP/IP stack of at least one managed device TCP/IP information relating to the attacker device, wherein the report comprises the extracted TCP/IP information.

4. The method of claim 2, wherein said performing the process comprises determining a warning level associated with the invalid logon, and wherein the report comprises the warning level.

5. The method of claim 4, wherein the report comprises the userid of the invalid logon, and wherein said determining the warning level comprises:
    determining that the userid of the invalid logon is the local userid defined on the local device, resulting in determining that the warning level is a low warning level;
    determining that the userid of the invalid logon is not the local userid defined on the local device and is not in the list of userids used by viruses, resulting in determining that the warning level is a medium warning level; or
    determining that the userid of the invalid logon is in the list of userids used by viruses, resulting in determining that the warning level is a high warning level.

6. The method of claim 2, wherein said generating comprises generating the report comprising the event log information, a host name of the network, an IP address of the at least one managed device, a local subnet of the network, a host name of the attacker device, an IP address of the attacker device, a TCP port of the attacker device, a port number of the incoming TCP/IP connection, a MAC address of the attacker device, a userid of the invalid logon, a warning level associated with the invalid logon, a date and time of the incoming TCP/IP connection, and a network switch through which the incoming TCP/IP connection was established.

7. The method of claim 2, wherein said performing the process comprises determining a MAC address of the attacker device, and wherein the report comprises the determined MAC address.

8. The method of claim 2, wherein the method further comprises determining a host name of the network, and wherein the report comprises the determined host name of the network.

9. The method of claim 2, wherein said generating comprises generating the report comprising the event log information, a city, building, and floor in which the attacker device is located.

10. The method of claim 1, said method further comprising:
    after said detecting the incoming TCP/IP connection and before said performing the process, determining that a port number of the incoming TCP/IP connection is identical to a port number in a set of predefined port numbers.

11. A system comprising a computer machine and a hardware storage medium readable by the computer machine, the hardware storage medium tangibly embodying readable program code configured to be executed by the computer machine to perform a method of identifying an attacker device attempting an intrusion into a TCP/IP protocol based network, said method comprising:
    detecting, by at least one managed device of the network, an incoming TCP/IP connection by the attacker device to the network;
    after said detecting the incoming TCP/IP connection, performing a process that comprises determining that the incoming TCP/IP connection is a Net BIOS connection that has created an invalid logon by the attacker device, linking the invalid logon with the NetBIOS TCP/IP connection, retrieving event log information from a security event log of the network, and determining (i) that a userid of the invalid logon is a local userid defined on a local device of the at least one managed device, (ii) that the userid of the invalid logon is a userid in a list of userids used by viruses, or (iii) that the userid of the invalid logon is neither the local userid defined on the local device nor is in the list of userids used by viruses; and after said performing the process, storing the retrieved event log information in a central violation database of the network.

12. The system of claim 11, said method comprising after said performing the process:
    generating a report comprising the event log information; and
    storing the report in the central violation database of the network.

13. The system of claim 12, said method further comprising:
    after said detecting the incoming TCP/IP connection and before said performing the process, extracting from a TCP/IP stack of at least one managed device TCP/IP information relating to the attacker device, wherein the report comprises the extracted TCP/IP information.

14. The system of claim 12, wherein said performing the process comprises determining a warning level associated with the invalid logon, and wherein the report comprises the warning level.

15. The system of claim 14, wherein the report comprises the userid of the invalid logon, and wherein said determining the warning level comprises:
    determining that the userid of the invalid logon is the local userid defined on the local device, resulting in determining that the warning level is a low warning level;
    determining that the userid of the invalid logon is not the local userid defined on the local device and is not in the list of userids used by viruses, resulting in determining that the warning level is a medium warning level; or
    determining that the userid of the invalid logon is in the list of userids used by viruses, resulting in determining that the warning level is a high warning level.

16. A computer program product stored on a hardware storage medium readable by a computer machine, the computer program product tangibly embodying readable program code configured to be executed by the computer machine to perform a method of identifying an attacker device attempting an intrusion into a TCP/IP protocol based network, said method comprising:
    detecting, by at least one managed device of the network, an incoming TCP/IP connection by the attacker device to the network;
    after said detecting the incoming TCP/IP connection, performing a process that comprises determining that the incoming TCP/IP connection is a Net BIOS connection that has created an invalid logon by the attacker device, linking the invalid logon with the NetBIOS TCP/IP connection, retrieving event log information from a security event log of the network, and determining (i) that a userid of the invalid logon is a local userid defined on a local device of the at least one managed device, (ii) that the userid of the invalid logon is a userid in a list of userids used by viruses, or (iii) that the userid of the invalid logon is neither the local userid defined on the local device nor is in the list of userids used by viruses; and
    after said performing the process, storing the retrieved event log information in a central violation database of the network.

17. The computer program product of claim 16, said method comprising after said performing the process:
    generating a report comprising the event log information; and
    storing the report in the central violation database of the network.

18. The computer program product of claim 17, said method further comprising:
    after said detecting the incoming TCP/IP connection and before said performing the process, extracting from a TCP/IP stack of at least one managed device TCP/IP information relating to the attacker device, wherein the report comprises the extracted TCP/IP information.

19. The computer program product of claim 17, wherein said performing the process comprises determining a warning level associated with the invalid logon, and wherein the report comprises the warning level.

20. The computer program product of claim 19, wherein the report comprises the userid of the invalid logon, and wherein said determining the warning level comprises:
    determining that the userid of the invalid logon is the local userid defined on the local device, resulting in determining that the warning level is a low warning level;
    determining that the userid of the invalid logon is not the local userid defined on the local device and is not in the list of userids used by viruses, resulting in determining that the warning level is a medium warning level; or
    determining that the userid of the invalid logon is in the list of userids used by viruses, resulting in determining that the warning level is a high warning level.

* * * * *